(12) United States Patent
Burton et al.

(10) Patent No.: US 10,807,172 B2
(45) Date of Patent: Oct. 20, 2020

(54) ROTARY CUTTING TOOL WITH HONE EDGES

(71) Applicant: Kyocera SGS Precision Tools, Inc., Munroe Falls, OH (US)

(72) Inventors: Jeffery L. Burton, Kent, OH (US); Douglas P. Bonfiglio, Clinton, OH (US); Jacob Rak, Munroe Falls, OH (US)

(73) Assignee: Kyocera SGS Precision Tools, Inc., Munroe Falls, OH (US)

( * ) Notice: Subject to any disclaimer, the term of this patent is extended or adjusted under 35 U.S.C. 154(b) by 31 days.

(21) Appl. No.: 16/108,530

(22) Filed: Aug. 22, 2018

(65) Prior Publication Data

US 2019/0061023 A1  Feb. 28, 2019

Related U.S. Application Data

(62) Division of application No. 14/741,608, filed on Jun. 17, 2015, now Pat. No. 10,058,934.

(Continued)

(51) Int. Cl.
*B23C 5/10* (2006.01)
*B24B 3/02* (2006.01)
*B24B 3/06* (2006.01)

(52) U.S. Cl.
CPC ............... *B23C 5/10* (2013.01); *B24B 3/021* (2013.01); *B24B 3/06* (2013.01);

(Continued)

(58) Field of Classification Search
CPC .............. B23C 5/10; B23C 2210/0407; B23C 2210/0485; B23C 2210/126; B24B 3/021; B24B 3/06; Y10T 407/1948
See application file for complete search history.

(56) References Cited

U.S. PATENT DOCUMENTS 3,217,382 A    11/1965  DeDobbelaere et al.
3,651,602 A *   3/1972  Hillier ...................... B24B 3/06
                                                                451/226

(Continued)

FOREIGN PATENT DOCUMENTS

DE    29 715 192 U1   12/1997
DE       10325600 A1    1/2005

(Continued)

*Primary Examiner* — Omar Flores Sanchez
(74) *Attorney, Agent, or Firm* — Vorys, Sater, Seymour and Pease LLP; Scott M. Guttman

(57) ABSTRACT

A rotary cutting tool includes a shaft having and outer surface and having a longitudinal axis, a plurality of helical flutes formed in the shaft about the longitudinal axis, a plurality of helical cutting edges formed at an interface with the outer surface and a respective helical flute about the longitudinal axis, and a plurality of end cutting edges located on an axial distal end of a cutting portion of the shaft, the end cutting edges being contiguous with a corresponding one of the plurality of helical cutting edges and forming a corner in the transition between each of the end cutting edges and the corresponding one of the plurality of helical cutting edges. A hone edge extends along a portion of each of the end cutting edges, the associated corner and a portion of the corresponding one of the plurality of helical cutting edges.

19 Claims, 13 Drawing Sheets

Related U.S. Application Data

(60) Provisional application No. 62/014,085, filed on Jun. 18, 2014.

(52) U.S. Cl.
CPC ............ *B23C 2210/0407* (2013.01); *B23C 2210/0485* (2013.01); *B23C 2210/126* (2013.01); *Y10T 407/1948* (2015.01)

(56) References Cited

U.S. PATENT DOCUMENTS

| | | | |
|---|---|---|---|
| 3,798,723 | A | 3/1974 | Czopor et al. |
| 4,963,059 | A | 10/1990 | Hiyama |
| 5,425,603 | A | 6/1995 | Dutschke et al. |
| 5,779,399 | A | 7/1998 | Kuberski |
| 5,913,644 | A | 6/1999 | DeRoche et al. |
| 5,947,649 | A | 9/1999 | Arai et al. |
| 6,007,276 | A | 12/1999 | Wardell |
| 6,132,146 | A | 10/2000 | Satran et al. |
| 6,435,780 | B1 | 8/2002 | Flynn |
| 6,846,135 | B2 | 1/2005 | Kuroda et al. |
| 6,991,409 | B2 | 1/2006 | Noland |
| 6,997,651 | B2 | 2/2006 | Kawai et al. |
| 7,234,224 | B1 * | 6/2007 | Naugler ............. B23C 3/34 29/557 |
| 7,306,408 | B2 | 12/2007 | Wells et al. |
| 7,588,396 | B2 * | 9/2009 | Flynn ............. B23C 5/10 407/34 |
| 7,789,597 | B2 | 9/2010 | Wells et al. |
| 8,414,228 | B2 | 4/2013 | Wells et al. |
| 8,939,682 | B2 | 1/2015 | Wells et al. |
| 9,227,253 | B1 | 1/2016 | Swift et al. |
| 10,058,934 | B2 * | 8/2018 | Burton ............. B23C 5/10 |
| 2002/0090273 | A1 | 7/2002 | Serwa |
| 2004/0105729 | A1 | 6/2004 | Giessler et al. |
| 2004/0120777 | A1 | 6/2004 | Noland |
| 2005/0084341 | A1 | 4/2005 | Long, II et al. |
| 2005/0105973 | A1 | 5/2005 | MacArthur |
| 2008/0219782 | A1 | 9/2008 | Flynn |
| 2012/0148352 | A1 | 6/2012 | Miki et al. |

FOREIGN PATENT DOCUMENTS

| | | |
|---|---|---|
| EP | 1971456 A2 | 9/2008 |
| JP | H06-129513 A | 11/1995 |
| JP | 2557189 Y2 | 12/1997 |
| JP | 2005-118960 A | 5/2005 |

* cited by examiner

FH

FH

BR

BR

ROTARY CUTTING TOOL WITH HONE EDGES

CROSS-REFERENCE TO RELATED APPLICATIONS

This application claims priority to and the benefit of U.S. patent application Ser. No. 14/741,608 filed Jun. 17, 2015, and U.S. Provisional Patent Application No. 62/014,085 filed Jun. 18, 2014, the contents of which are hereby incorporated in their entirety.

BACKGROUND

This relates in general to rotary cutting tools. One type of known rotary cutting tool is an end mill, see FIG. 1. End mills typically consist of one or more flutes including a deep helical groove that runs up the cylindrical outer surface of the milling bit. In operation, associated cutting edges may cut a work piece material; together, the flutes and cutting edges—by virtue of rotation of the milling bit—cut away and remove pieces of the work piece in a manner that creates the desired form.

One example of a known rotary cutting tool is the Z-Carb® end mill manufactured under U.S. Pat. No. 4,963,059. The U.S. Pat. No. 4,963,059 disclosed an end mill having a plurality of paired helical flutes forming an even number of helical peripheral cutting edges equally spaced circumferentially in one plane wherein the peripheral cutting edges are formed as a plurality of pairs of diametrically opposite cutting edges having the same helix angle and thereby being symmetrical with respect to the axis of the body.

End mills peripheral cutting edges remove the bulk of material, but the chip forming process starts near the corner of each edge. Repeated impact in this region can be particularly stressful to an end mill and some form of strengthening is desired.

The corners of carbide end mills can be one the weakest area of such a tool, see FIG. 2. The corners of end mills also tend to be the most vulnerable area, being most susceptible to the onset of chip damage, see FIG. 3. The increased operating parameters brought about by the ever increasing use of high performance end mill designs has furthered this concern. Several methods that have been explored and implemented to protecting these corners includes a series of grinds, which may be costly and/or difficult to control during manufacturing.

One know simple method of corner strengthening includes a chamfer. Other more complicated methods includes a corner radius, see FIGS. 4 and 5. A corner radius will reduce stresses in the areas where applied. However this method is not sufficient protection for milling most materials. Additional protection methods include a faced hook, see FIGS. 6 and 7 at FH, in which the gashing at the end of the tool is carried out to the corners. This may significantly increase the strength by making the geometry more negative, i.e. blunt; however the tradeoff is lost shearing capability and less efficient cutting.

Further methods include the above combined with various gashing methods. A blending grind may be added to the corner radius to further improve functionality and smooth the surface transition. A compromise is to blend the end gashing into the fluting to subdue the faced hook. This is commonly called a "B-Rad" (blend radius), or blend gashing. The downside is that this blend is difficult to manufacture and some of the negative geometry still exists, see FIGS. 8 and 9 at BR.

Additionally, portions of all of the above tools still tend to be subject to chipping or other generally undesired damage.

SUMMARY

This relates more specifically to a rotary cutting tool including a shaft having an outer surface and having a longitudinal axis with a plurality of helical flutes formed in the shaft about the longitudinal axis and a plurality of helical cutting edges formed at an interface of a respective the helical flutes with the outer surface about the longitudinal axis One embodiment includes treating the cutting edges as an improved method of reducing corner damage and improving performance of solid carbide end mills. One such treatment includes honing at least a portion of the cutting edges. Honing is the action of rounding an otherwise sharp cutting edge so as to remove keenness and thereby toughen the edge for improved chip resistance. One treatment may include a consistent hone, which encompasses the radial edges, in part of around the entire periphery, but it is consistent in size, with virtually no variation.

The treatment may include varying hone, varying the hone size according to location along the cutting edge or around the periphery. In one example, there is hone applied to the radial edges and a relatively heavier hone applied to areas requiring additional toughness, such as the corner radii.

It is expected that this varying hone will result in less corner chipping. In one instance, the application of the varying hone may be achieved through the use of a computer controlled brush honing machine, which provides the control required to change hone size. Such a machine may be further enhanced by flanging the normally loose filament brush so as to better localize the filament, resulting in a more precise honing process.

Testing of the varying hone shows that not only are the corner radii sufficiently more protected, cutting force and torque are reduced, and radial edge condition is improved, as compared to other methods for reducing corner chipping.

In at least one embodiment, a rotary cutting tool includes a shaft having and outer surface and having a longitudinal axis, a plurality of helical flutes formed in the shaft about the longitudinal axis, a plurality of helical cutting edges formed at an interface with the outer surface and a respective helical flute about the longitudinal axis, and a plurality of end cutting edges located on an axial distal end of a cutting portion of the shaft, the end cutting edges being contiguous with a corresponding one of the plurality of helical cutting edges and forming a corner in the transition between each of the end cutting edges and the corresponding one of the plurality of helical cutting edges. A hone edge extends along a portion of each of the end cutting edges, the associated corner and a portion of the corresponding one of the plurality of helical cutting edges.

Various aspects will become apparent to those skilled in the art from the following detailed description and the accompanying drawings.

DETAILED DESCRIPTION

Figure 1:
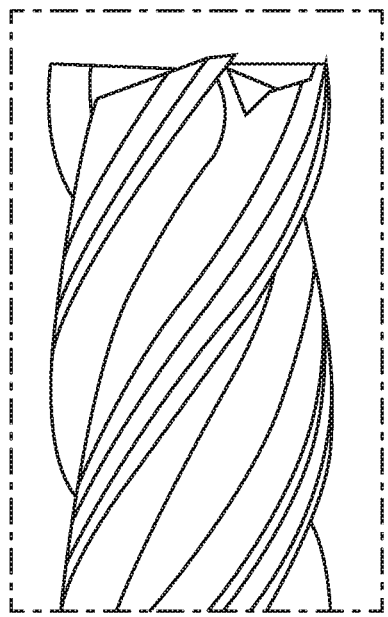
FIG. 1 is a side view of a known end mill.
Figure 2:
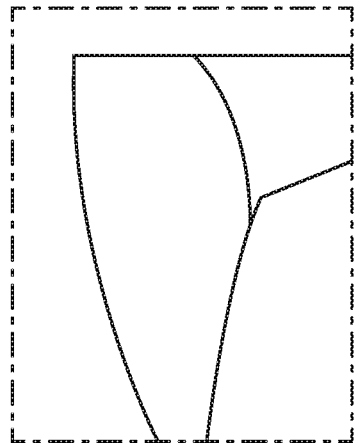
FIG. 2 is an enlarged portion of the end mill of FIG. 1.
Figure 3:
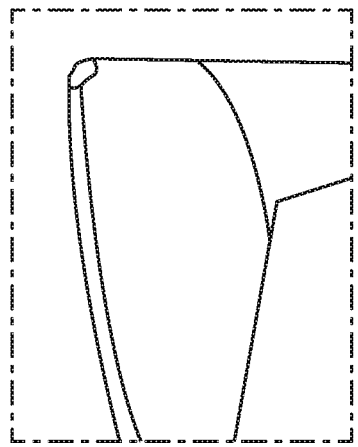
FIG. 3 is a view similar to FIG. 2 except showing the end will after significant wear. and show new and used corners.
Figure 4:
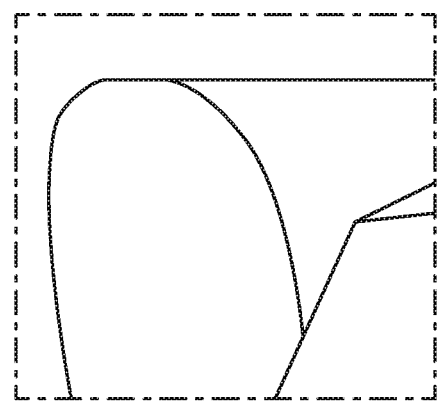
FIG. 4 is a tangential view of a portion of an end mill with corner radius.
Figure 5:
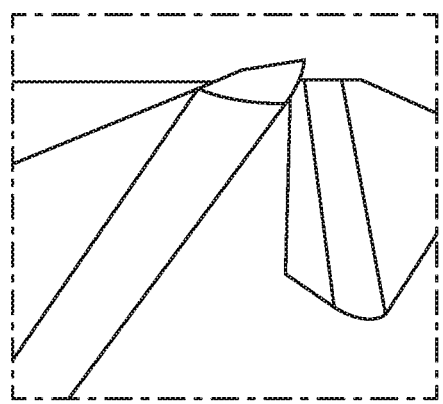
FIG. 5 is a side of the portion of the end mill of FIG. 4.
Figure 6:
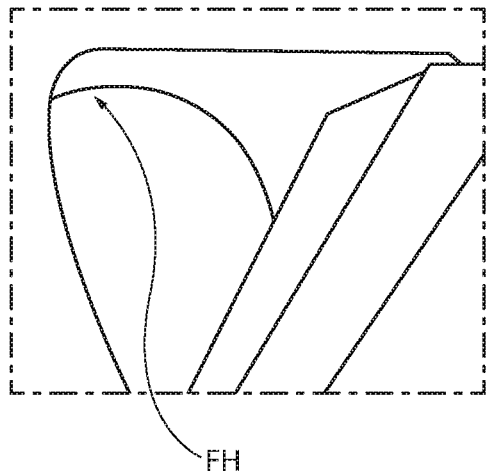
FIG. 6 is a tangential view of a portion of an end mill with faced hook.
Figure 7:
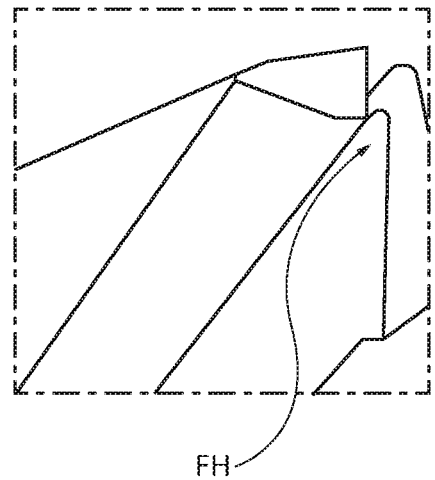
FIG. 7 is a side of the portion of the end mill of FIG. 4.
Figure 8:
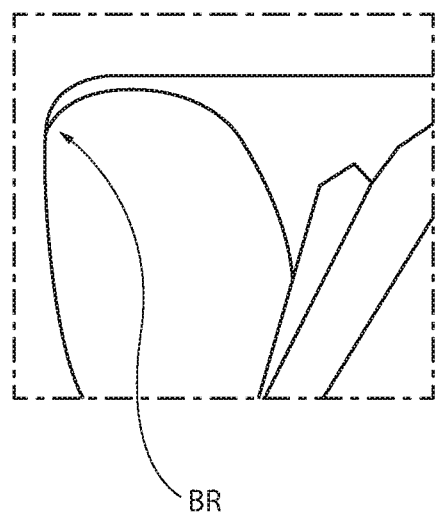
FIG. 8 is a tangential view of a portion of an end mill with B-Rad.
Figure 9:
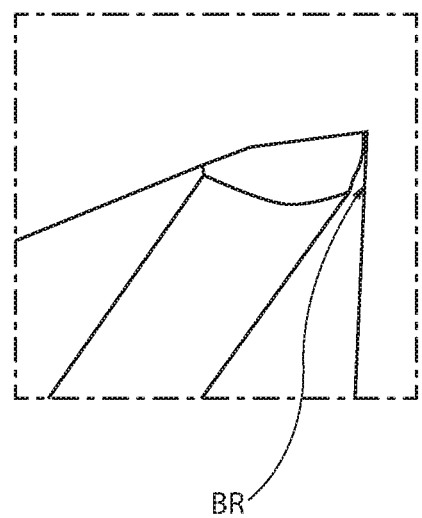
FIG. 9 is a side of the portion of the end mill of FIG. 4.
Figure 10:
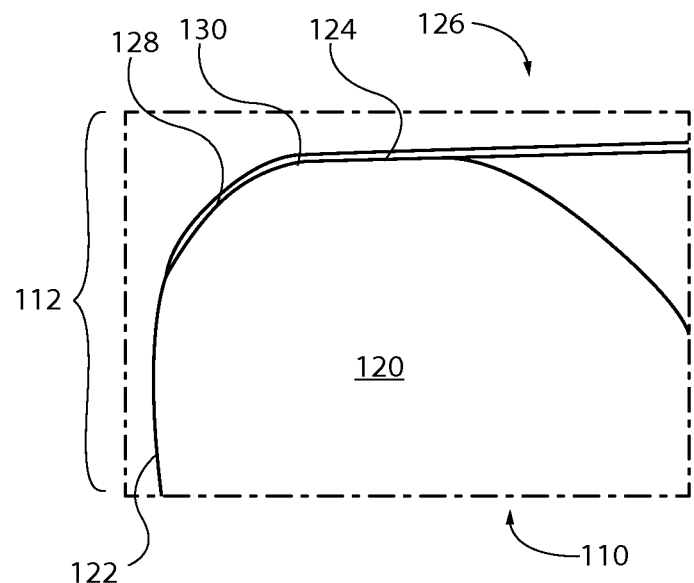
FIG. 10 is an enlarged front view of a portion of an end mill with hone edges.
Figure 11:
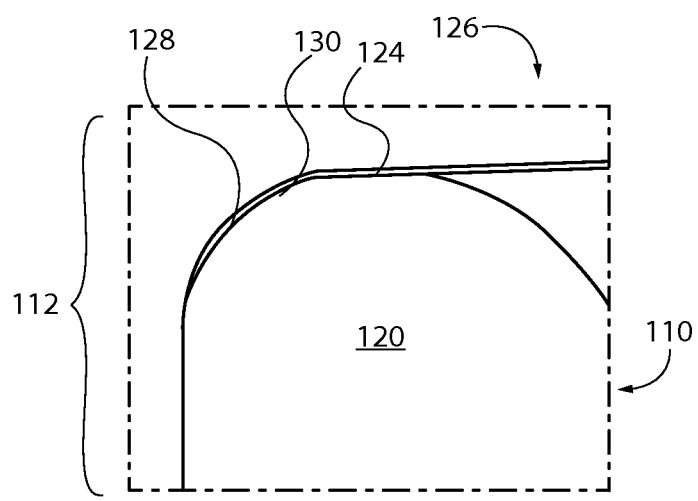
FIG. 11 is a further enlarged portion of FIG. 10.
Figure 12:
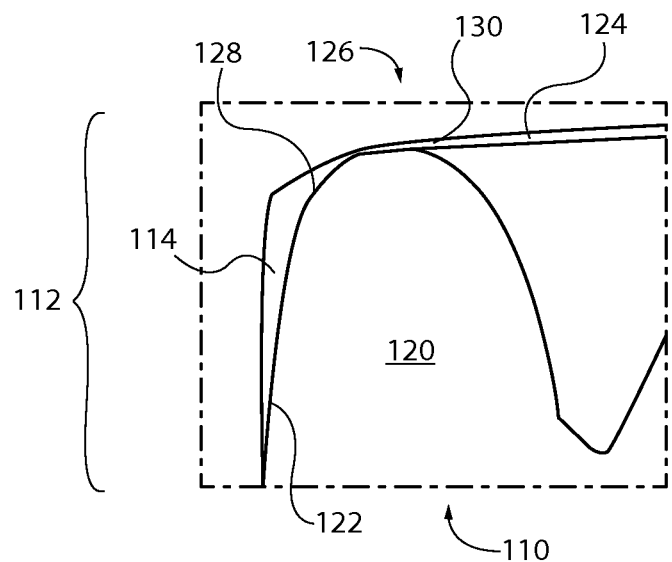
FIG. 12 is a tangential view the end mill of FIG. 10.
Figure 13:
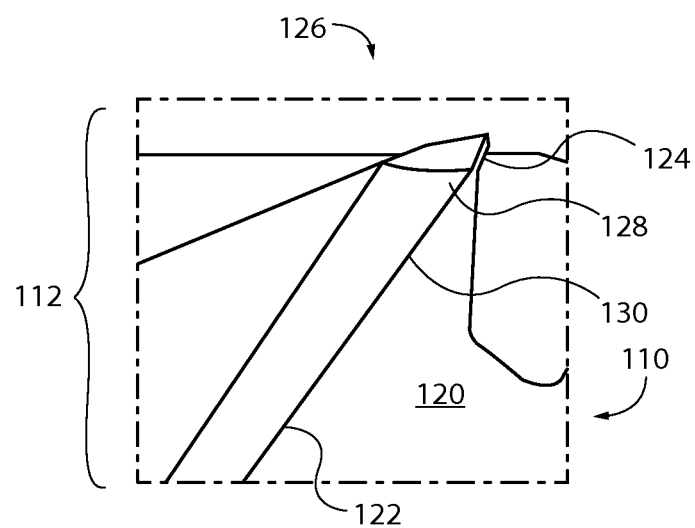
FIG. 13 is a side view of the end mill of FIG. 10.
Figure 14:
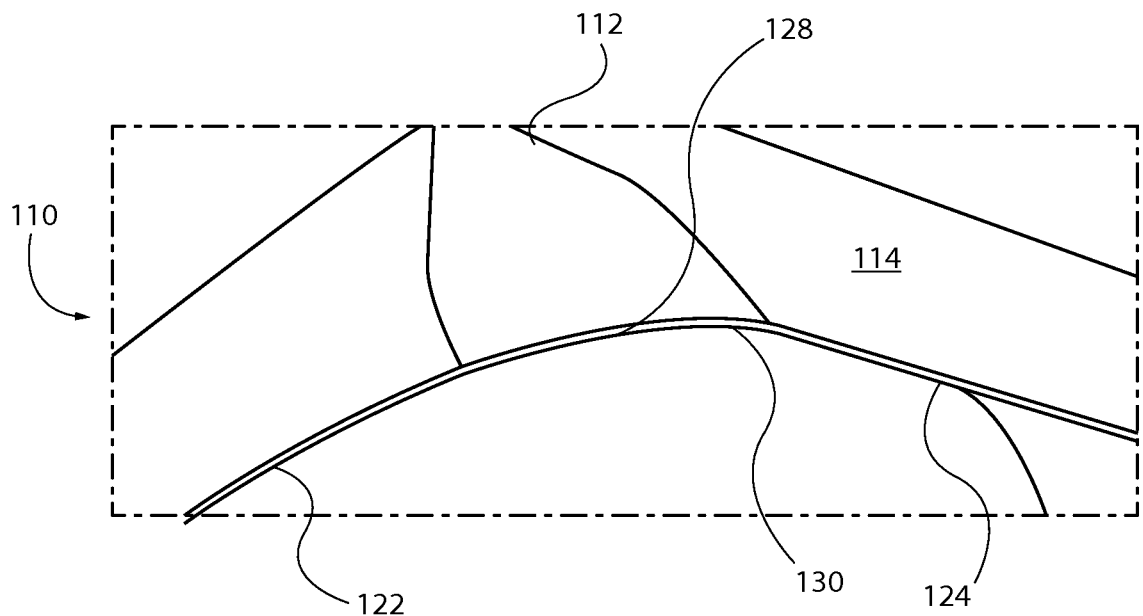
FIG. 14 is an enlarged perspective view of the hone edge of the end mill of FIG. 10.
Figure 15:
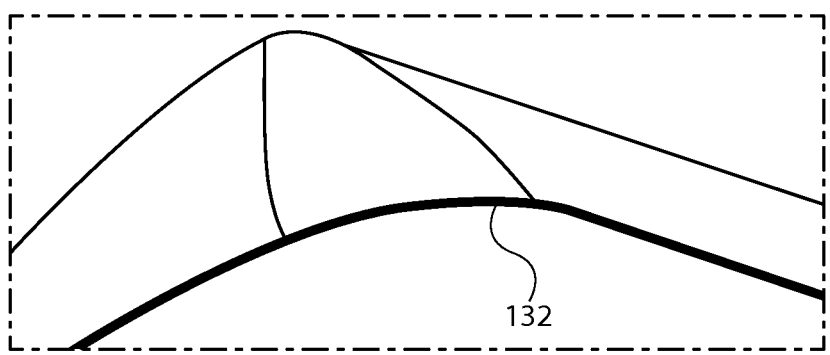
FIG. 15 is a schematic illustration of a first hone edge.
Figure 16:
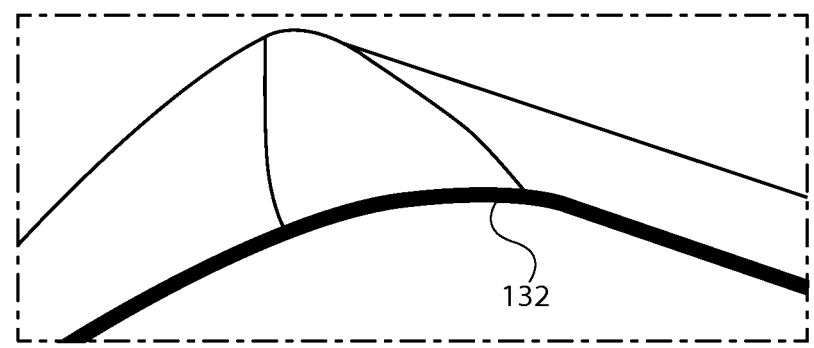
FIG. 16 is a schematic illustration of a second hone edge.
Figure 17:
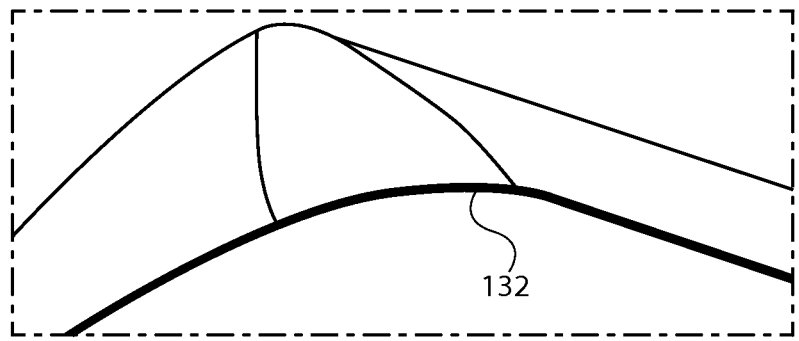
FIG. 17 is a schematic illustration of a third hone edge.
Figure 18:
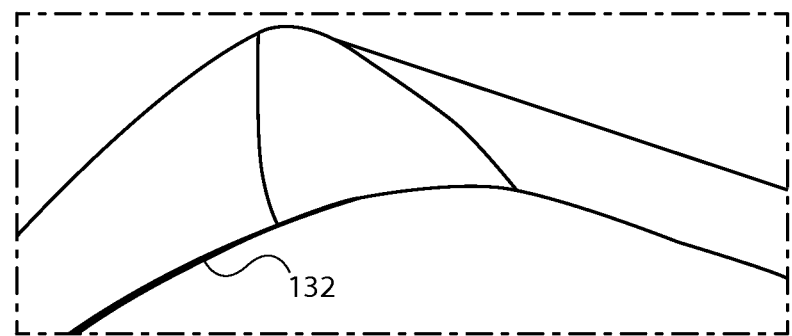
FIG. 18 is a schematic illustration of a fourth hone edge.
Figure 19:
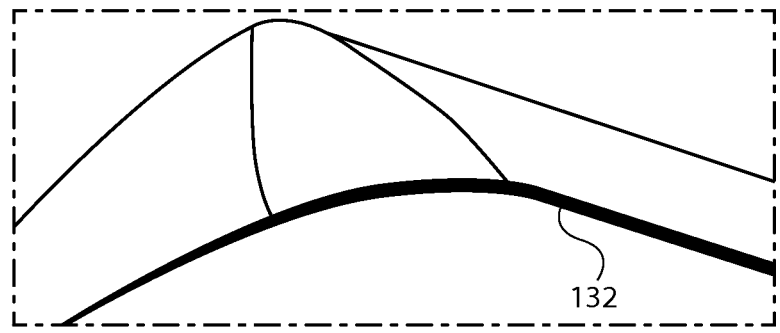
FIG. 19 is a schematic illustration of a fifth hone edge.

There is shown in FIGS. 10-14, 21 and 28 an end mill rotary cutting tool 110. The tool 110 includes a shaft 112 having and an outer surface 114 and having a longitudinal axis X. The shaft 112 includes a shank portion 116, see FIG. 22, and cutting portion 118. A plurality of helical flutes 120 are formed in the shaft 112 in the cutting portion 118 about the longitudinal axis X.

A plurality of helical cutting edges 122 are formed at an interface with the outer surface 114 and a respective helical flute 120 about the longitudinal axis X. A plurality of end cutting edges 124 are located on an axial distal end 126 of the cutting portion 118 of the shaft 112. The end cutting edges 124 are contiguous with a corresponding one of the plurality of helical cutting edges 122 and form a corner 128 in the transition between each of the end cutting edges 124 and the corresponding one of the plurality of helical cutting edges 122.

A hone edge 130 extends along a portion of each of the end cutting edges 124, the associated corner 128 and a portion of the corresponding one of the plurality of helical cutting edges 122.

The hone edges 130 may all be varying hone edges, that is to say that the amount of honing may vary along the length of the edge. The varying hone edges 130 may, for example, increase from the associated helical cutting edge 122 toward the associated end cutting edge 124. There may be increased honing on the corners 128 as compared to the helical cutting edges 122 or as compared to the end cutting edges 124 or both. The hone edges 130 may be formed to all be geometrically positive.

The end mill of Claim 2 where the helix angle of the helical flutes varies along the longitudinal axis.

The rake angle of the helical cutting edges 122 may vary along the longitudinal axis X.

There is illustrated in FIGS. 15-19 a variety of hone edge with the thickness of the hone line 132 indicating the amount of honing by location.

In one embodiment, edges are rounded with a diamond impregnated fiber brush. Upon testing, see the method of corner strengthening has produced significant results. The corner radius stronger, as compared to other methods, and cutting force and torque were lower, and overall tool condition was better.

This method may include that the treatment size would not be consistent over the entire edge length. For example, it may vary so as to provide protection according to the load associated with a specific location on an end mill, or vary in any other way as desired. As an example, the axial edges may receive 0.001-0.002 (inch) radius, transitioning around the corner radius to 0.0003-0.0005 (inch) on the radial edges.

Listed are some of the benefits discovered provided by varying edge treatment as compared to other edge treatments: reduction of maximum force by 13.8% and torque by 11.5%, improvement of chip resistance at the corners over conventional protection methods, and improvement of chip resistance along the radial cutting edge.

In one embodiment this may be combine with varying helix and/or varying rake to create a tool where the combination of two or three work together. It is expected that the varying rake/varying helix will reduce vibration, while the varying hone may be able to withstand more vibration. It is expected that when combined these features will create a highly chip resistant design.

Figure 20:
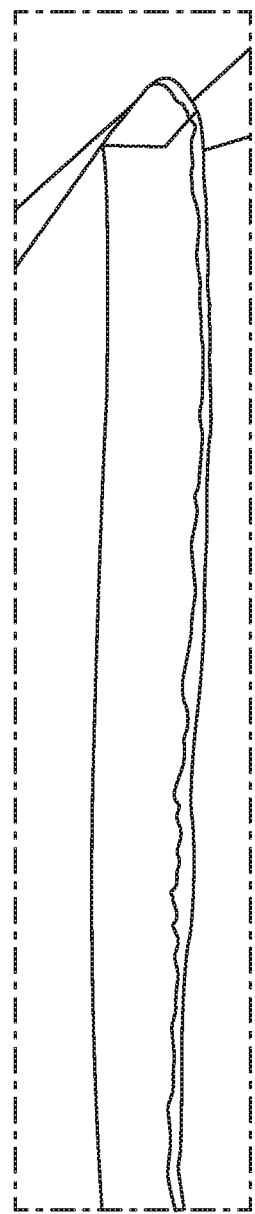
FIG. 20 is an enlarged view of a cutting edge of a conventional end mill after use.
Figure 21:
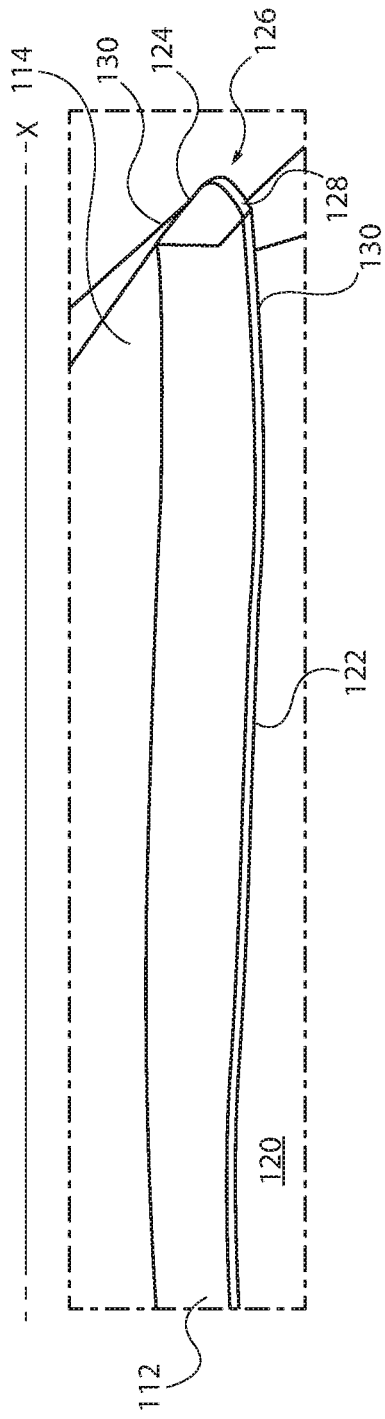
FIG. 21 is an enlarged view of a cutting edge of an end mill with hone edge after use.
Figure 22:
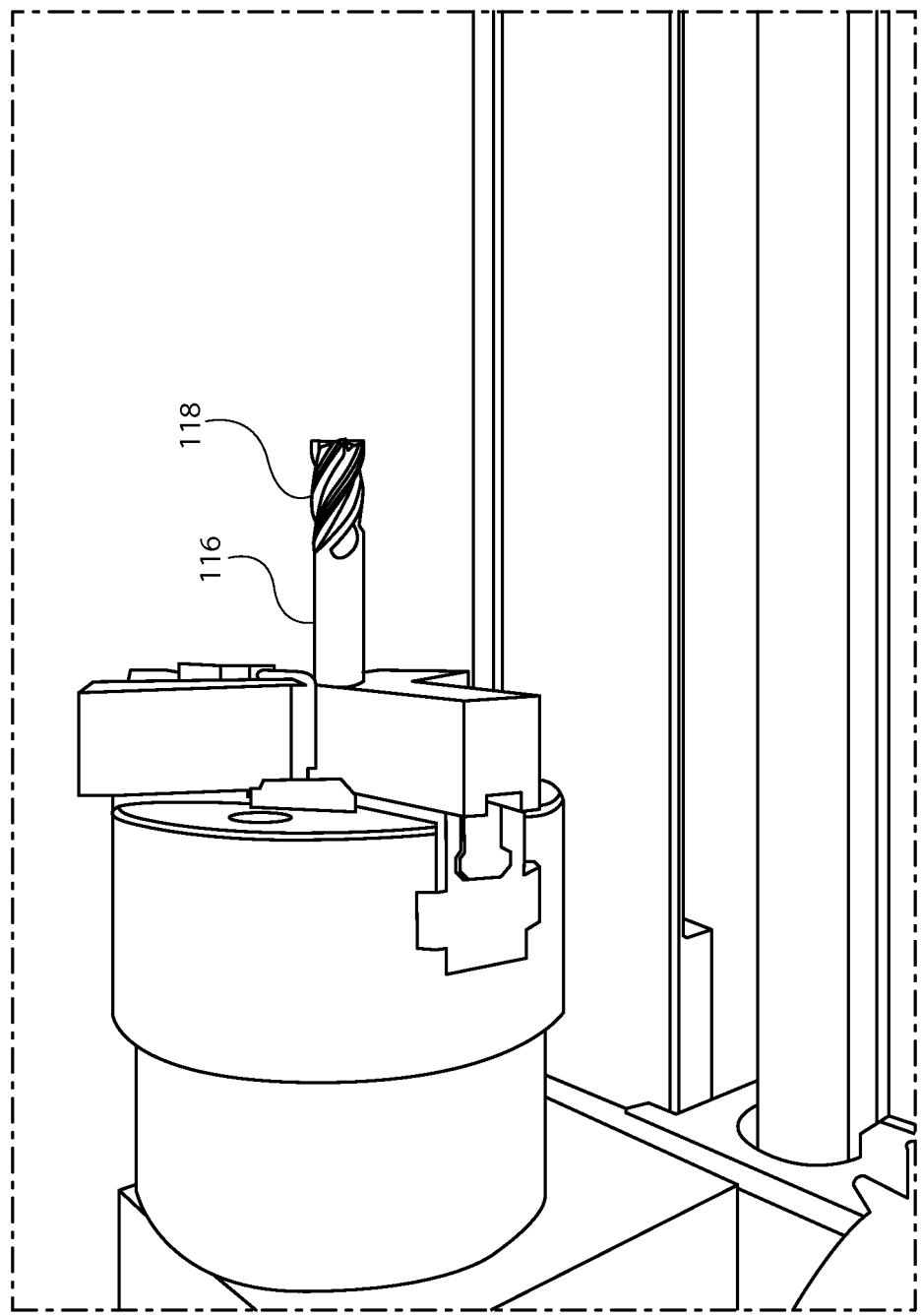
FIG. 22 is a front view of a portion of a CNC machine including a chuck holding a shaft.
Figure 23:
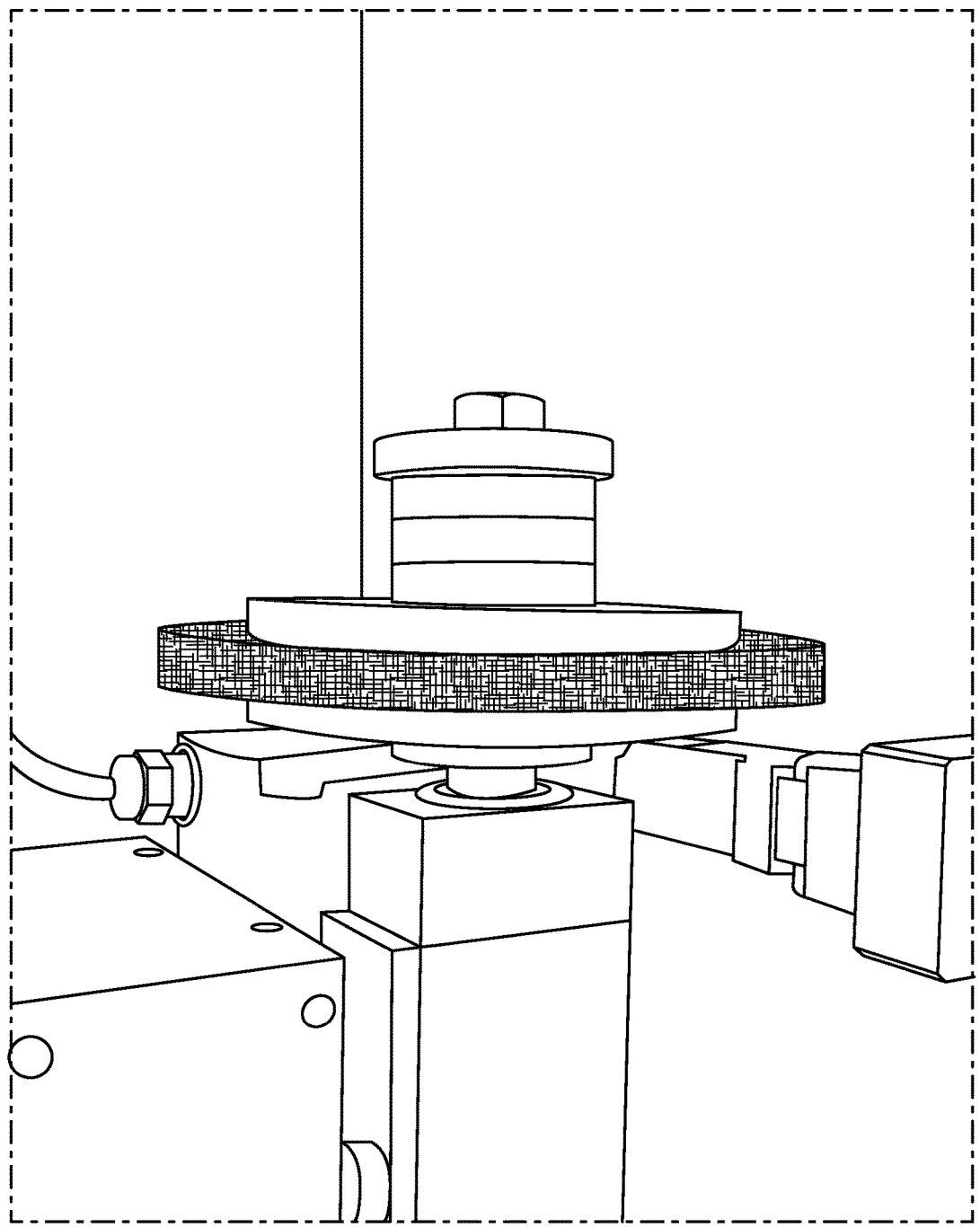
FIG. 23 is a front view of another portion of the CNC machine of FIG. 22 including a machine brush.
Figure 24:
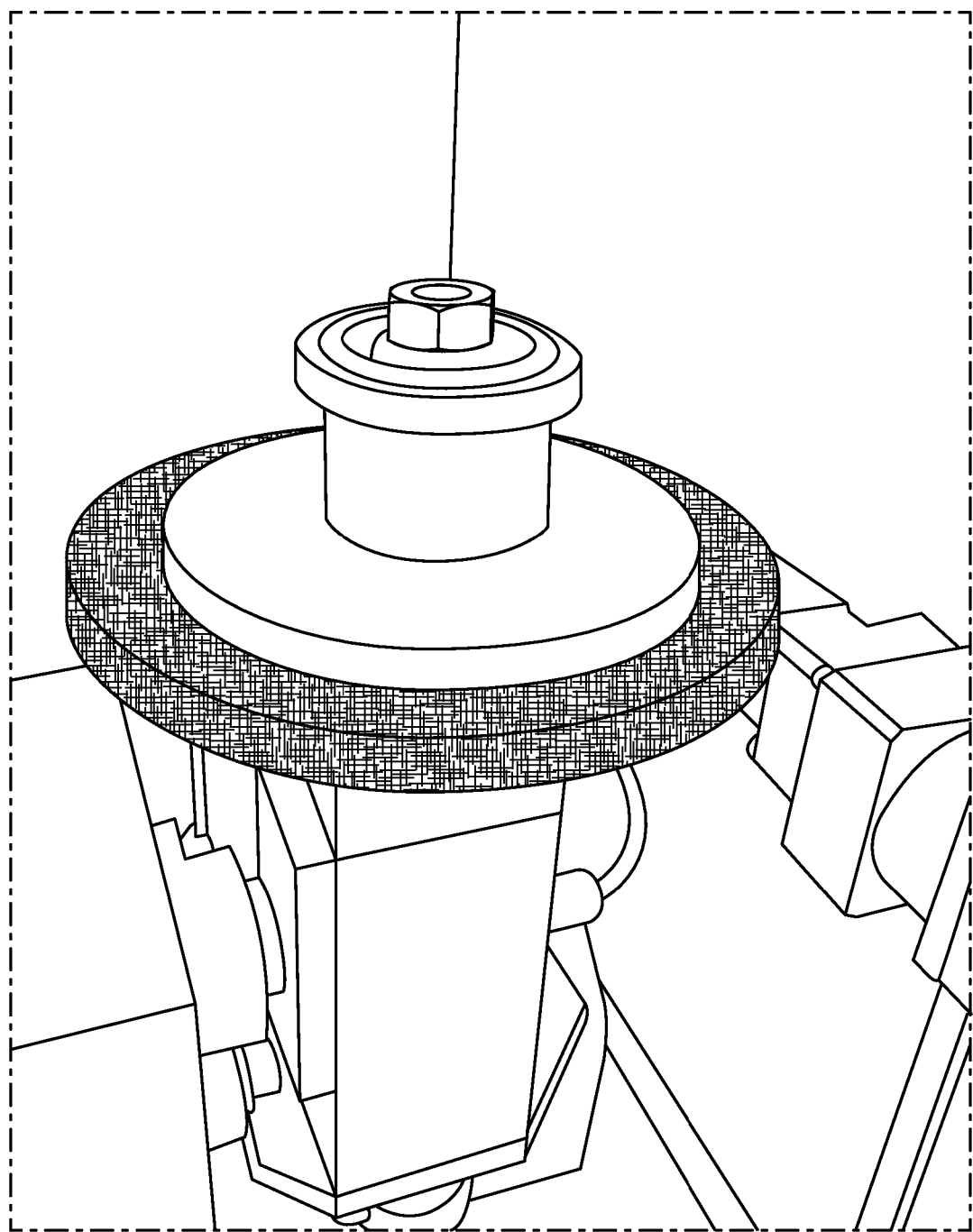
FIG. 24 is a perspective view of the brush of FIG. 23.
Figure 25:
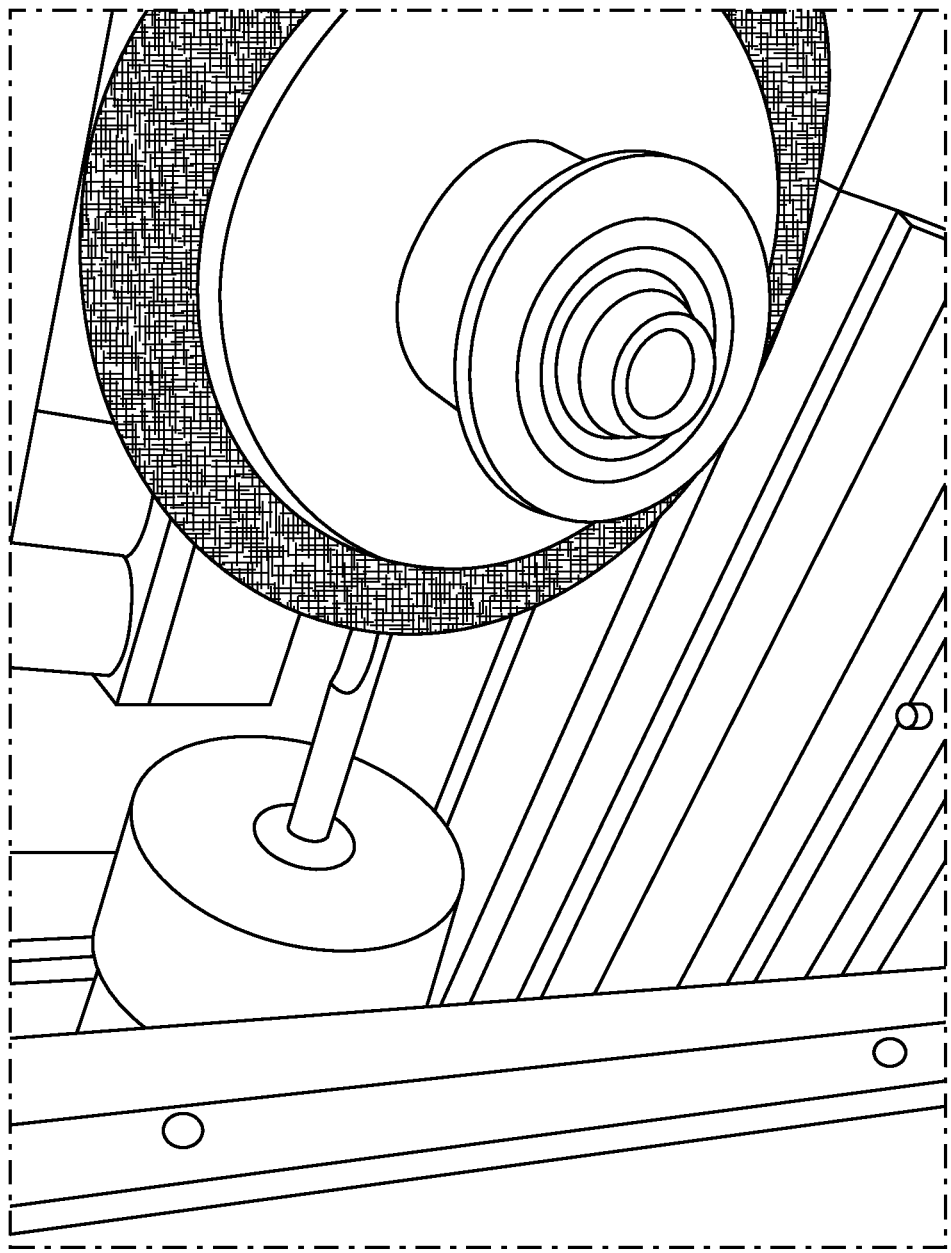
FIG. 25 is another perspective view of the CNC machine of FIGS. 22-24 showing the machine in operation.
Figure 26:
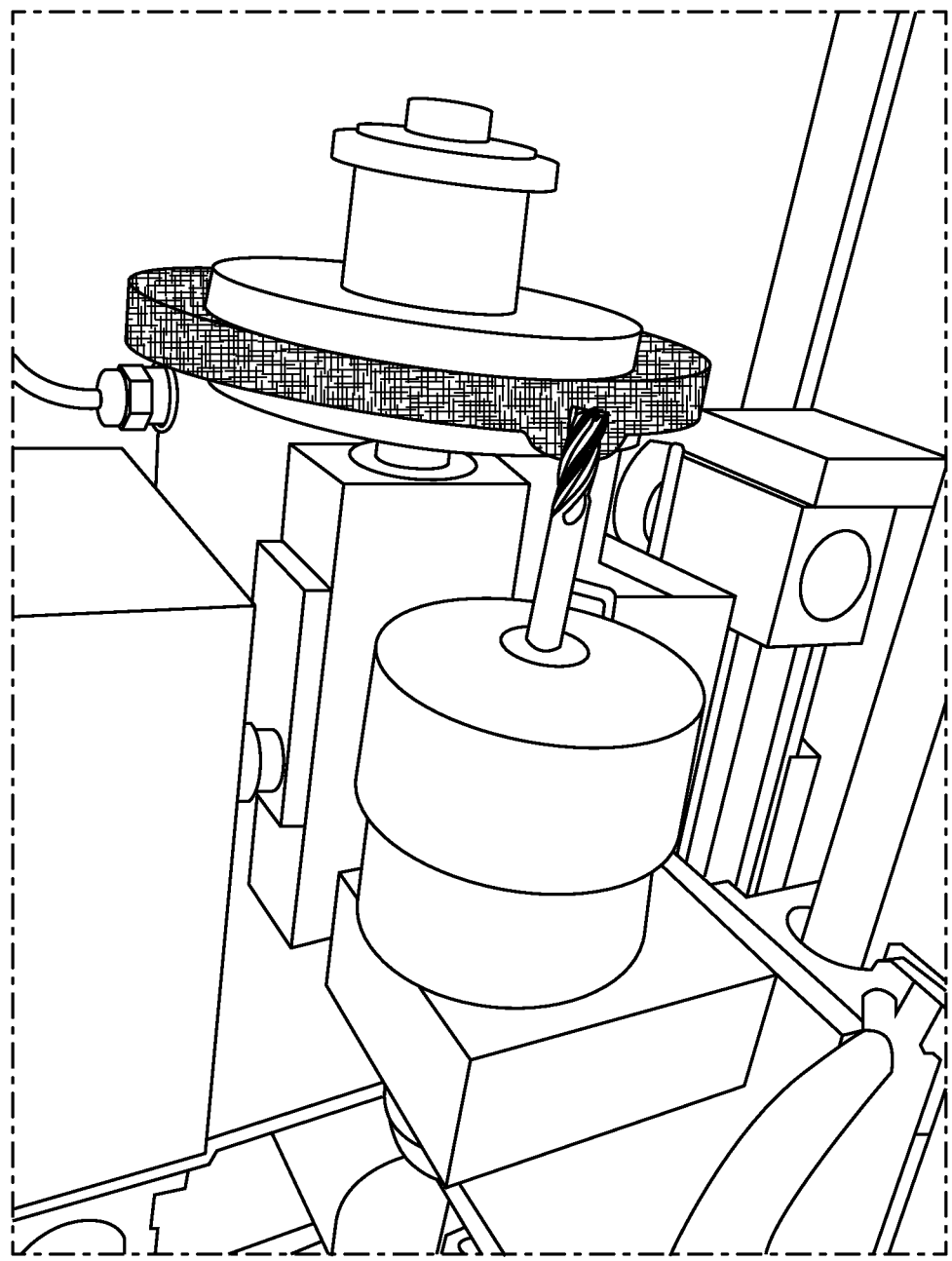
FIG. 26 is a further perspective view of the CNC machine of FIGS. 22-24 showing the machine in further operation.
Figure 27:
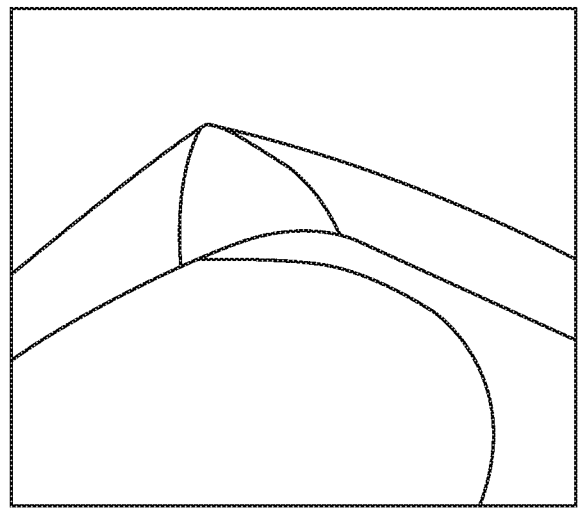
FIG. 27 shows an end mill with B-Rad.
Figure 28:
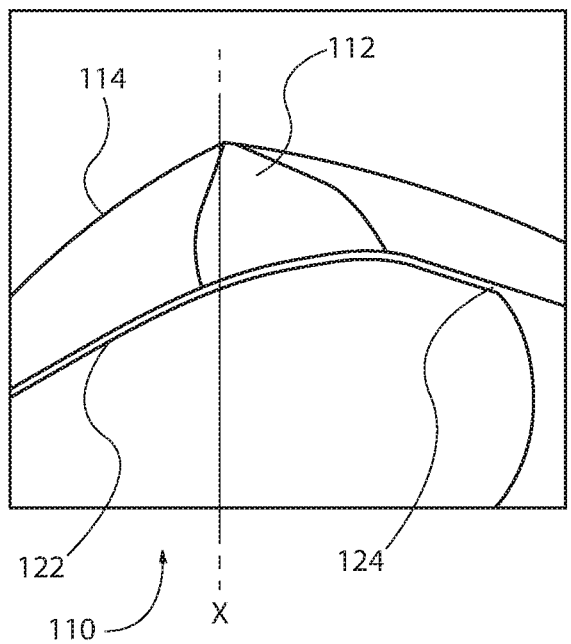
FIG. 28 shows an end mill with hone edge.

Illustrated is a test that compares a standard Z-Carb AP manufactured with a B-Rad, see FIGS. 20 and 27, to the identical product manufactured without a B-Rad, but with an axial edge treatment (hone) of 0.001 (inch), see FIGS. 21 and 28.

Profile cuts were made in 4140 and 316 stainless at Tool Wizard parameters. Parameters for Test 085-09 were duplicated, which was a test that had shown the comparison between a B-Rad and a conventional unprotected corner radius. In the 4140 profile test, the stockroom sample (T1) showed micro-chipping, as typically observed during a coating test. T2, without the B-Rad but with the axial hone, did not show this edge condition. Neither tool showed any notable corner radius area damage. In Test 2, profile milling in 316 stainless, the stockroom sample (T3) showed edge chipping which was not exhibited by T4, the non-B-Rad/axial honed tool. Neither tool showed any corner damage. Test 3 involved profile milling in 15-5 PH stainless and after milling 1600 inches both tools (T5 and T6) had identical wear and chipping and no corner radius area damage. Test 4 used the load cell to determine tool load while plunging. Each tool was plunged into the 4140 workpiece three times and the forces measured, recorded and averaged. Tool 8 with no B-Rad and the axial hone averaged 14 percent less maximum Z-axis force and 12 percent less maximum torque than the stockroom sample (T7).

In summary, in these tests, the stockroom samples showed edge damage equal to or worse than the axial honed tools, as well as generating more Z-axis force and torque while plunging. Overall, the preliminary results suggest the axial edge treatment is not detrimental to performance, and is likely beneficial to reduce corner damage as compared to the non-axial honed tools.

Below are Tables representing Test 1-Test 4 that illustrate four tests of stock sample compared to a honed sample.

| Tool Wizard parameters (Test 1) | | | MACHINE | TOOL HOLDER | COOLANT |
|---|---|---|---|---|---|
| | 4140 alloy steel 28HRc | | Haas VM3 | Techniks ER-32 short | S-373 |
| | SPEED | FEED | | RADIAL WIDTH | AXIAL DEPTH |
| | 2,865 rpm/ 375 sfm | 26.24 ipm/ .00229 ipt | | .250" (50% D) | .500" (D) |
| TOOL NO. | TYPE DESCRIPTION | TIR IN MACHINE | USAGE | INSPECTION . . . NOTES | |
| 1 | ZAP1C05000_030TX stockroom sample | .0003" | 640" | Varying micro chipping on cutting edges and corner radii. | |
| 2 | Test sample without B-Rad; .001" axial hone, | .0004" | 640" | Even and consistent on cutting edges and corner radii | |

| Tool Wizard parameters (Test 2) | WORKPIECE | MACHINE | TOOL HOLDER | COOLANT |
|---|---|---|---|---|
| | 316 stainless | Haas VM3 | Techniks ER-32 short | S-373 |
| | SPEED | FEED | RADIAL WIDTH | AXIAL DEPTH |
| | 3,025 rpm/ 396 sfm | 21.78 ipm/ .0018 ipt | .250" (50% D) | .400" (80% D) |
| TOOL NO. | TYPE DESCRIPTION | TIR IN MACHINE | USAGE INSPECTION . . . NOTES | |
| 3 | ZAP1C05000_030TX stockroom sample | .0003" | 640" | Varying edge damage with chipping .0044" to .007" on primary Corners/ B-Rad intact |
| 4 | Test sample without B-Rad; .001" axial hone, | .0002" | 640" | .0008" edge wear, even and consistent on cutting edges and corner radii |

| Parameters from test 085-09 (Test 3) | WORKPIECE | MACHINE | TOOL HOLDER | COOLANT |
|---|---|---|---|---|
| | 15-5 PH stainless 35/37 HRc | Haas VM3 | Techniks ER-32 short | S-373 |
| | SPEED | FEED | RADIAL WIDTH | AXIAL DEPTH |
| | 2,180 rpm/ 285 sfm | 17.0 ipm/ .0019 ipt | .250" | .125" |
| TOOL NO. | TYPE DESCRIPTION | TIR IN MACHINE | USAGE | INSPECTION . . . NOTES |
| 5 | ZAP1C05000_030TX stockroom sample | .0002" | 1120" 1600" | .0025" wear, not tool damage .0032" wear, each flute has a small chip on edge. No corner area damage |
| 6 | Test sample without B-Rad; .001" axial hone, | .0004" | 1120" 1600" | .0025" wear, no tool damage. .0033" wear, each flute has a small chip on edge. No corner area damage. |

| Plunge-in load cell (Test 4) | WORKPIECE | MACHINE | TOOL HOLDER | COOLANT |
|---|---|---|---|---|
| | 4140 alloy steel 28HRc | Haas VM3 | Techniks ER-32 short | S-373 |
| | SPEED | FEED | RADIAL WIDTH | AXIAL DEPTH |
| | 2,865 rpm/.375 sfm | 13.0 ipm/.0045 ipr | .500" (D) | .050" |

| TOOL NO. | TYPE DESCRIPTION | TIR IN MACHINE | USAGE | INSPECTION ... NOTES |
|---|---|---|---|---|
| 7 | ZAP1C05000_030TX stockroom sample | .0003" | 3 plunges | 328.14 lbs average maximum Z-axis load, 69.1 average in lbs torque |
| 8 | Test sample without B-Rad; .001" axial hone, | .0003" | 3 plunges | 282.89 lbs average maximum Z-axis load, 61.1 average in lbs torque |

Comments:
Tool 8 had approximately 14% less average Z-axis load and 12% less average torque requirement (maxiumuns)

Below are Tables Tool 7 and Tool 8 that give the parameters for the stock sample and honed sample, Plunges 1-3.

| Tool 7 stockroom sample | | |
|---|---|---|
| Plunge 1 | Plunge 2 | Plunge 3 |
| UNITS → "lbs" | UNITS → "lbs" | UNITS → "lbs" |
| MEAN → 265.72 | MEAN → 265.85 | MEAN → 275.03 |
| STD DEV. → 50.05 | STD DEV. → 54.32 | STD DEV. → 66.14 |
| MINIMUM → 104.80 | MINIMUM → 117.05 | MINIMUM → 70.62 |
| MEDIAN → 282.62 | MEDIAN → 284.24 | MEDIAN → 291.65 |
| MAXIMUM → 315.67 | MAXIMUM → 315.67 | MAXIMUM → 353.08 |
| UNITS → "inlb" | UNITS → "inlb" | UNITS → "inlb" |
| MEAN → 52.211 | MEAN → 50.895 | MEAN → 50.236 |
| STD DEV. → 11.651 | STD DEV. → 15.633 | STD DEV. → 15.741 |
| MINIMUM → 19.342 | MINIMUM → 5.120 | MINIMUM → 6.827 |
| MEDIAN → 54.233 | MEDIAN → 54.327 | MEDIAN → 52.716 |
| MAXIMUM → 66.274 | MAXIMUM → 71.204 | MAXIMUM → 69.687 |

| Tool 8 without B-Rad and .001 axial edge prep/ hone | | |
|---|---|---|
| Plunge 1 | Plunge 2 | Plunge 3 |
| UNITS → "lbs" | UNITS → "lbs" | UNITS → "lbs" |
| MEAN → 238.00 | MEAN → 244.21 | MEAN → 248.13 |
| STD DEV. → 15.09 | STD DEV. → 20.69 | STD DEV. → 38.18 |
| MINIMUM → 205.42 | MINIMUM → 184.60 | MINIMUM → 119.71 |
| MEDIAN → 239.90 | MEDIAN → 247.55 | MEDIAN → 253.56 |
| MAXIMUM → 261.21 | MAXIMUM → 267.55 | MAXIMUM → 319.92 |
| UNITS → "inlb" | UNITS → "inlb" | UNITS → "inlb" |
| MEAN → 46.779 | MEAN → 47.885 | MEAN → 48.260 |
| STD DEV. → 7.386 | STD DEV. → 7.835 | STD DEV. → 13.354 |
| MINIMUM → 22.394 | MINIMUM → 20.964 | MINIMUM → 7.433 |
| MEDIAN → 49.076 | MEDIAN → 49.409 | MEDIAN → 48.028 |
| MAXIMUM → 55.175 | MAXIMUM → 57.938 | MAXIMUM → 70.136 |

The developed method addresses the corner strength issue while also maintaining efficient shearing capability. By utilizing a CNC brush honing machine, method has been crafted to utilize brush wheel of the hone machine to produce a relatively wider, heavier hone at the axial end of the tool which diminishes in size as it proceeds down the radial side of the flutes.

By eliminating the faced hook and B-Rad, the shearing capability is improved and by adding the variable hone the corners are protected.

One method of forming a rotary cutting tool includes the steps of:

providing a shaft having and outer surface and having a longitudinal axis;

forming a plurality of helical flutes in the shaft about the longitudinal axis defining a cutting portion, the remainder of the shaft defining a shank portion;

forming a plurality of helical cutting edges at an interface with the outer surface and a respective helical flute about the longitudinal axis;

forming a plurality of end cutting edges on an axial distal end of cutting portion of the shaft, the end cutting edges being contiguous with a corresponding one of the plurality of helical cutting edges and forming a corner in the transition between each of the end cutting edges and the corresponding one of the plurality of helical cutting edges; and forming a hone edge extending along a portion of each of the end cutting edges, the associated corner and a portion of the corresponding one of the plurality of helical cutting edges.

Referring to FIGS. 22-26, the shaft may be secured in chuck at the shank portion and then rotated. A machining brush may be provided and applied to the helical cutting edges, the corners, and/or the end cutting edges to form hone edges, such as varying hone edges. The brush may include filaments flanged between two disks. This may be performed by a CNC machine.

While principles and modes of operation have been explained and illustrated with regard to particular embodiments, it must be understood, however, that this may be practiced otherwise than as specifically explained and illustrated without departing from its spirit or scope.

What is claimed is:

1. A method of forming a rotary cutting tool comprising:
providing a shaft having an outer surface and having a longitudinal axis forming a plurality of helical flutes in the shaft about the longitudinal axis defining a cutting portion, a remainder of the shaft defining a shank portion;

forming a plurality of helical cutting edges at an interface with the outer surface and a respective helical flute about the longitudinal axis;

forming a plurality of end cutting edges on an axial distal end of the cutting portion of the shaft, the end cutting edges being contiguous with a corresponding one of the plurality of helical cutting edges and forming a corner in a transition between each of the end cutting edges and the corresponding one of the plurality of helical cutting edges; and engaging one of the plurality of helical cutting edges, one of the plurality of end cutting edges associated therewith, and the corner transitioning therebetween with a filament brush to form a hone edge extending along a length of each of the one of the plurality of end cutting edges, the corresponding one of the plurality of helical cutting edges, and the corner transitioning therebetween.

2. The method of claim 1 further comprising, prior to forming the hone edges,
securing the shaft in a chuck at the shank portion.

3. The method of claim 2 where the forming the hone edges includes rotating the shaft by the chuck.

4. The method of claim 1 where the filament brush is secured to a honing machine, and
where in the forming the hone edges includes applying the filament brush of the honing machine to the length of the one of the plurality of helical cutting edges.

5. The method of claim 1 where the filament brush includes filaments flanged between two disks.

6. The Method of claim 1 where the filament brush is secured to a honing machine, and
where in the forming the hone edges includes applying the filament brush of the honing machine to the length of the one of the plurality of end cutting edges.

7. The method of claim 6 where the honing machine includes filaments flanged between two disks.

8. The method of claim 1 where the hone edges are varying hone edges.

9. The method of claim 8 where the varying hone edges increase from the associated helical cutting edge toward the end cutting edge associated therewith.

10. The method of claim 8 where there is increased honing on the corners as compared to the helical cutting edges.

11. The method of claim 1 where the forming hone edges is performed by a CNC machine.

12. The method of claim 1 where the filament brush engages one of the plurality of helical cutting edges with a varying load along the length of the one of the plurality of helical cutting edges.

13. The method of claim 1 where the filament brush engages one of the plurality of end cutting edges with a varying load along the length of the one of the plurality of end cutting edges.

14. The method of claim 1 where the filament brush engages one of the plurality of helical cutting edges and the one of the plurality of end cutting edges with a varying load along both the length of the one of the plurality of helical cutting edges and the length of the one of the plurality of end cutting edges.

15. The method of claim 4 where the filament brush of the honing machine is applied to the length of the one of the plurality of helical cutting edges with a varying load.

16. The method of claim 6 where the filament brush of the honing machine is applied to the length of the one of the plurality of end cutting edges with a varying load.

17. The method of claim 1 where the filament brush is a diamond impregnated fiber brush.

18. The method of claim 4 further comprising:
pivoting the filament brush of the hone machine 90 degrees about the corner; and
where forming the hone edges includes applying the filament brush of the honing machine to the length of the one of the plurality of end cutting edges.

19. The method of claim 1 where the hone edge extending along the length of each of the one of the plurality end cutting edges, the corresponding one of the plurality of helical cutting edges, and the corner transitioning therebetween includes an edge radius, where the edge radius is variable along the hone edge length through the helical cutting edge, the corner, and the end cutting edge and where an axial angle and a radial angle of the contiguous hone edge are geometrically positive relative to rotating the shaft in a clock-wise rotational direction about the longitudinal axis.

* * * * *